US005671133A

United States Patent [19]

Fujita et al.

[11] Patent Number: 5,671,133

[45] Date of Patent: Sep. 23, 1997

[54] ELECTRIC POWER RECEIVING AND SUPPLYING CIRCUIT

[75] Inventors: Suguru Fujita; Makoto Hasegawa, both of Tokyo, Japan

[73] Assignee: Matsushita Electrical Industrial Co., Ltd., Japan

[21] Appl. No.: 374,096

[22] Filed: Jan. 18, 1995

[30] Foreign Application Priority Data

Feb. 10, 1994 [JP] Japan .................................... 6-016315

[51] Int. Cl.$^{6}$ ....................................................... H02M 7/06

[52] U.S. Cl. .......................... 363/126; 327/308; 327/311; 333/81 A

[58] Field of Search ............................ 363/126; 219/748; 333/81 R, 81 A; 327/308, 311

[56] References Cited

U.S. PATENT DOCUMENTS

| | | | |
|---|---|---|---|
| 3,846,724 | 11/1974 | Maier | 333/81 R |
| 4,019,160 | 4/1977 | Kam | 333/81 R |
| 4,668,882 | 5/1987 | Matsuura | 307/540 |
| 4,918,749 | 4/1990 | Entschlanden et al. | 455/327 |
| 4,942,375 | 7/1990 | Petitjean et al. | 333/81 R |

FOREIGN PATENT DOCUMENTS 63-54023 3/1988 Japan .

*Primary Examiner*—Peter S. Wong
*Assistant Examiner*—Shawn Riley
*Attorney, Agent, or Firm*—Rossi & Associates

[57] ABSTRACT

An electric power receiving and supplying circuit comprises: a microstrip patch antenna, having a feeding point, for receiving a microwave signal and supplying an electric power; a rectifier, for rectifying the electric power, having: a first diode having an anode, connected to the feeding point, and a cathode; a second diode having a cathode, connected to the cathode of the first diode through a junction point, and an anode; and a high-frequency grounding circuit for high-frequency-grounding the anode of the second diode, and a lowpass filter for low-pass filtering the rectified electric power to supply a dc supply power. The circuit mentioned above may further comprise: a third diode having an anode connected to the high frequency grounding circuit, and a cathode connected to the junction point, or may further comprise: a third diode having an anode connected to the high frequency grounding circuit, and a cathode connected to the anode of the second diode, or may further comprise: a third diode having a cathode connected to the feeding point and a anode connected to the high frequency grounding circuit and the anode of the second diode. The above-mentioned circuit may further comprise a matching circuit for matching the antenna and the rectifying circuit.

16 Claims, 3 Drawing Sheets

ELECTRIC POWER RECEIVING AND SUPPLYING CIRCUIT

BACKGROUND OF THE INVENTION

1. Field of the Invention

This invention relates to an electric power receiving and supplying circuit for receiving an electric power from a microwave signal transmitted and for supplying a supply power and particularly to an electric power receiving and supplying circuit for supplying a supply power for a responder of a mobile unit identification system.

2. Description of the Prior Art

An electric power receiving and supplying circuit for receiving an electric power from a microwave signal transmitted and for supplying a supply power for a responder of a mobile unit identification system is known. Such a prior art electric power receiving and supplying circuit is disclosed in Japanese patent application provisional publication No. 63-54023. FIG. 6 is a plan view, partially schematic view, of the prior art electric power receiving and supplying circuit. The prior art electric power receiving and supplying circuit comprises a single antenna 20 for receiving a horizontally polarized energy signal and a rectifying circuit including diodes 23*a* and 23*b* and a diode 23 having a shunt resistor for receiving and developing a dc voltage from data signal horizontally polarized.

However, in the above-mentioned prior art electric power receiving circuit, the electric power is obtained through a halfwave double voltage rectification, so that there is a problem that an energy of the microwave cannot be converted into a dc power efficiently.

SUMMARY OF THE INVENTION

The aim of the present invention is to provide an improved electric power receiving and supplying circuit.

According to the present invention there is provided an electric power receiving and supplying circuit comprising: a microstrip patch antenna, having a feeding point, for receiving a microwave signal and supplying an electric power; a rectifier, for rectifying the electric power, having: a first diode having an anode, connected to the feeding point, and a cathode; a second diode having a cathode, connected to the cathode of the first diode through a junction point, and an anode; and a high-frequency grounding circuit for high-frequency-grounding the anode of the second diode, and a lowpass filter for low-pass filtering the rectified electric power to supply a dc supply power. The circuit mentioned above may further comprise a third diode having an anode connected to the high frequency grounding circuit, and a cathode connected to the junction point, or may further comprise a third diode having an anode connected to the high frequency grounding circuit, and a cathode connected to the anode of the second diode, or may further comprise a third diode having a cathode connected to the feeding point and a anode connected to the high frequency grounding circuit and the anode of the second diode. The above-mentioned circuit may further comprise a matching circuit for matching the antenna and the rectifying circuit.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Figure 1:
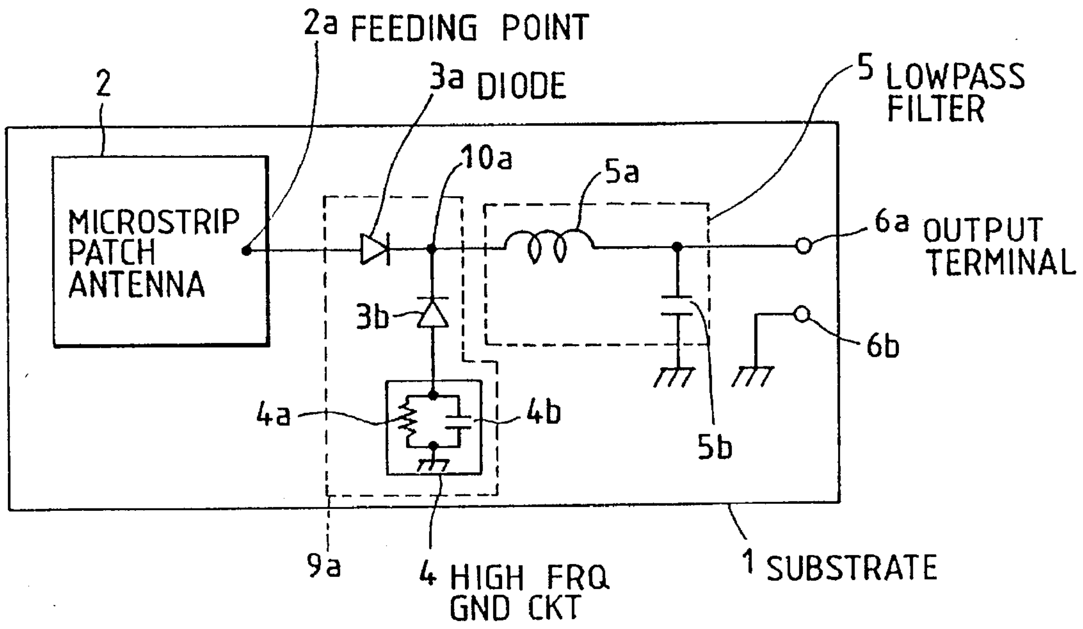
FIG. 1 is a plan view, partially schematic view, of the first embodiment of an electric power receiving and supplying circuit.

Hereinbelow will be described a first embodiment of this invention. FIG. 1 is a plan view, partially schematic view, of the first embodiment of an electric power receiving and supplying circuit. The electric power receiving and supplying circuit of the first embodiment comprising a microstrip patch antenna 2 formed on a substrate 1, having a rectangular shape and a feeding point around a middle of one side of the rectangular shape, for receiving and supplying an electric power from a microwave transmitted from an interrogator, a rectifying circuit 9*a* for rectifying the supplied electric power, a lowpass filter 5 for removing a high frequency component from an output of a rectifying circuit 9*a* and supplying a dc supply power through output terminals 6*a* and 6*b*. The rectifying circuit 9*a* comprises: a diode 3*a* having an anode connected to the feeding point 2*a* of the microstrip patch antenna 2 and a cathode; a diode 3*b* having a cathode, connected to the cathode of the diode 3*a* through a junction point 10*a*, and an anode; and a high frequency grounding circuit 4, connected to the anode of the diode 3*b* and the ground, for high-frequency-grounding the anode of the diode 3*b*. The microstrip patch antenna 2 has the rectangular shape having sides of about a half of a wavelength. However, various sizes and various shapes of the antennas can be applied to this embodiment.

The lowpass filter 5 comprises a coil 5*a* having a first end connected to the junction point 10*a* and a second end connected to the output terminal 6*a* and a capacitor 5*b* having one end connected to the output terminal 6*a* and the other end connected to the ground. The high frequency grounding circuit 4 comprises a resistor 4*a* and a capacitor 4*b* connected in parallel to the resistor 4*a*, one end of the high frequency grounding circuit being connected to the anode of the diode 3*b* and the other end being grounded.

The microstrip patch antenna 2 receives a microwave signal transmitted from an interrogator and converts it to an electric power. The rectifying circuit 9*a* rectifies the electric power supplied from the microstrip patch antenna 2 in the full-wave rectifying manner to supply a dc voltage through the junction point 10*a*. More specifically, the diodes 3*a* effects a half-wave rectifying. However, there is a stray capacitance between the terminals of the diodes 3*a* so that the ac electric power from the microstrip antenna 2 cannot be fully converted into a dc power. Therefore, the ac power which has not been converted by the diode 3*a* is further half-wave rectified by the diode 3*b*.

The lowpass filter 5 removes a high frequency component from the output of the rectifying circuit 9*a* and supplying a dc supply power through output terminals 6*a* and 6*b*. The rectifying circuit 9*a* rectifies the electric power supplied from the microstrip patch antenna 2 in the full-wave rectifying manner, so that a rectifying efficient is considerably high.

Figure 2:
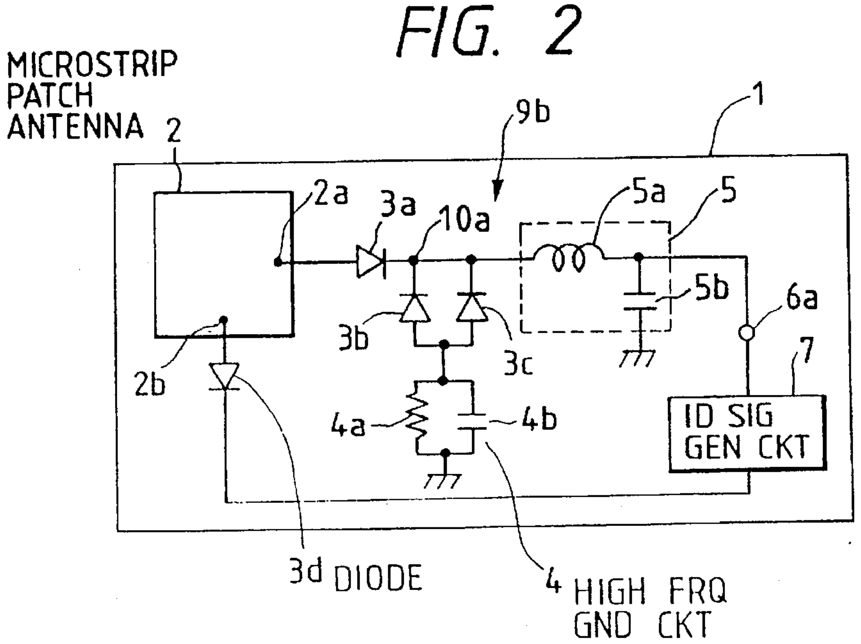
FIG. 2 is a plan view, partially schematic view, of the second embodiment of an electric power receiving and supplying circuit.

A second embodiment will be described with reference to FIG. 2. FIG. 2 is a plan view, partially schematic view, of the second embodiment of an electric power receiving and supplying circuit.

The electric power receiving and supplying circuit of the second embodiment has substantially the same structure as the first embodiment. The difference is in that a diode 3*c* is added in parallel to the diode 3*b* and an identification signal generation circuit 7 for supplying an identification signal and a diode 3*d* for supplying the identification signal to the microstrip patch antenna 2 are added.

The diode 3*c* has an anode connected to the anode of the diode 3*b* and to the high frequency grounding circuit 4 and a cathode connected to the junction point 10*a* also. In this embodiment, the diodes 3*b* and 3*c* are provided in parallel to each other, so that the rectifying efficiently is further increased. More specifically, the rectifying operation is similar to the first embodiment. However, currents flowing through the diodes 3*b* and 3*c* can be made small by the parallel connection, so that a change in impedance between an operation condition and a non-operation condition can be made small.

The identification signal generation circuit 7 supplied with the dc supply from the output terminal 6*a* generates and supplies the identification signal to another feeding point 2*b* of the microstrip antenna 2 through the diode 3*d*. The identification signal is transmitted from the microstrip patch antenna 2 in the different polarizing direction from the received microwave signal.

Figure 3:
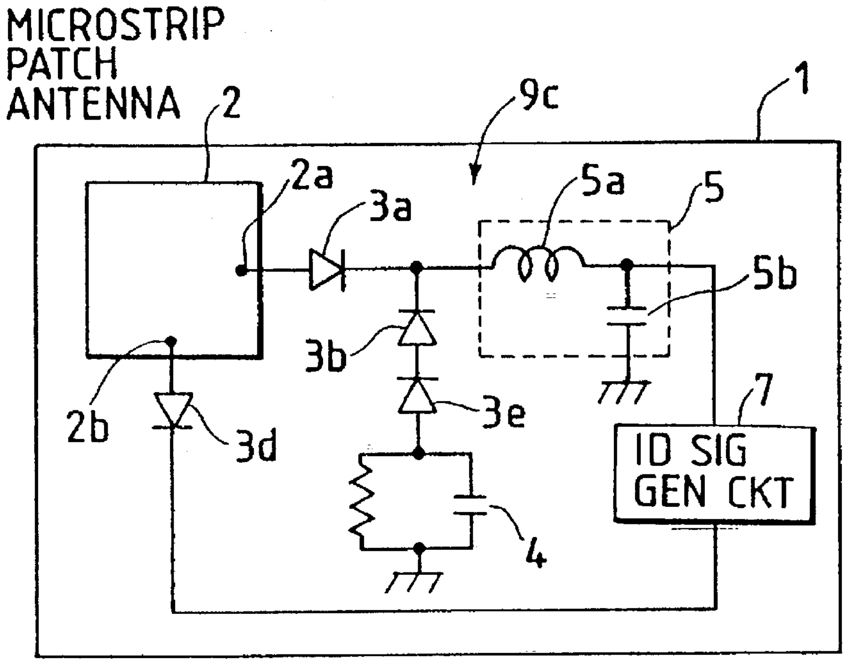
FIG. 3 is a plan view, partially schematic view, of the third embodiment of an electric power receiving and supplying circuit.

A third embodiment will be described with reference to FIG. 3. FIG. 3 is a plan view, partially schematic view, of the third embodiment of an electric power receiving and supplying circuit.

The electric power receiving and supplying circuit of the third embodiment has substantially the same structure as the first embodiment. The difference is in that a diode 3*e* is added and connected to the diode 3*b* in series and the identification signal generation circuit 7 for supplying the identification signal and the diode 3*d* for supplying the identification signal to the microstrip patch antenna 2 are added.

The diode 3*e* is provided between the diode 3*b* and the high frequency grounding circuit 4. That is, the diode 3*e* has a cathode, connected to the anode of the diode 3*b*, and an anode connected to the high frequency grounding circuit 4. In this embodiment, the diodes 3*b* and 3*e* are provided in series, so that the rectifying efficiently is further increased and the bandwidth of the signal to be rectified is increased. More specifically, the rectifying operation is similar to the first embodiment. However, voltages applied to the diodes 3*b* and 3*e* can be made small by the series connection, so that a change in impedance between an operation condition and a non-operation condition can be made small.

The identification signal generation circuit 7 supplied with the dc supply from the output terminal 6*a* generates and supplies the identification signal to another feeding point 2*b* of the microstrip antenna 2 through the diode 3*d*. The identification signal is transmitted from the microstrip antenna 2 in the different polarizing direction from the received microwave signal in the similar manner to the second embodiment.

Figure 4:
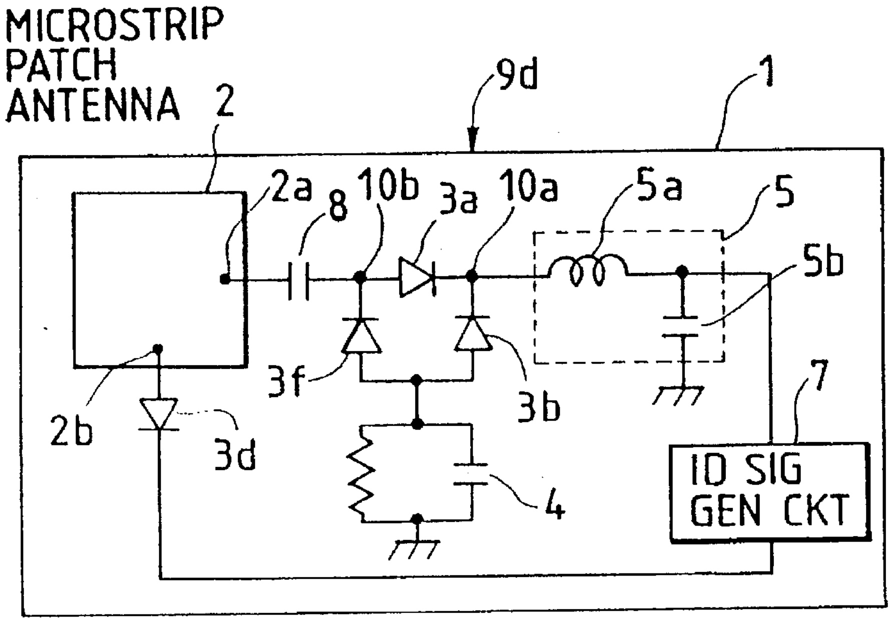
FIG. 4 is a plan view, partially schematic view, of the fourth embodiment of an electric power receiving and supplying circuit.

A fourth embodiment will be described with reference to FIG. 4. FIG. 4 is a plan view, partially schematic view, of the fourth embodiment of an electric power receiving and supplying circuit.

The electric power receiving and supplying circuit of the fourth embodiment has substantially the same structure as the first embodiment. The difference is in that a diode 3*f* is add and that the identification signal generation circuit 7 for supplying the identification signal and the diode 3*d* for supplying the identification signal to the microstrip patch antenna 2 are added. Moreover, a capacitor 8 is provided between the feeding point 2 and the anode of the diode 3*a* for ac coupling between the microstrip patch antenna 2 and the rectifying circuit 9*d*, i.e., for cutting of a dc component.

The diode 3*f* is provided between the anode of the diode 3*a* and the high frequency grounding circuit 4. That is, the diode 3*f* has a cathode, connected to the anode of the diode 3*b*, and an anode connected to the high frequency grounding circuit 4. The output of the rectifying circuit 9*d* of this embodiment is supplied to the lowpass filter 5 from the junction point 10*a*. In this embodiment, the diodes 3*a*, 3*b*, and 3*f* are provided, so that the rectifying efficiently is further increased. More specifically, the diodes 3*a* and 3*f* effect a half-wave rectifying. However, there is a stray capacitance between the terminals of the diodes 3*a*, so that the ac electric power from the microstrip antenna 2 cannot be fully converted into a dc power. Therefore, the ac power which has not been converted by the diode 3*a* is further half-wave rectified by the diode 3*b*.

The identification signal generation circuit 7 supplied with the dc supply from the output terminal 6*a* generates and supplies the identification signal to another feeding point 2*b* of the microstrip antenna 2 through the diode 3*d*. The identification signal is transmitted from the microstrip antenna 2 in the different polarizing direction from the received microwave signal in the similar manner to the second embodiment.

Figure 5:
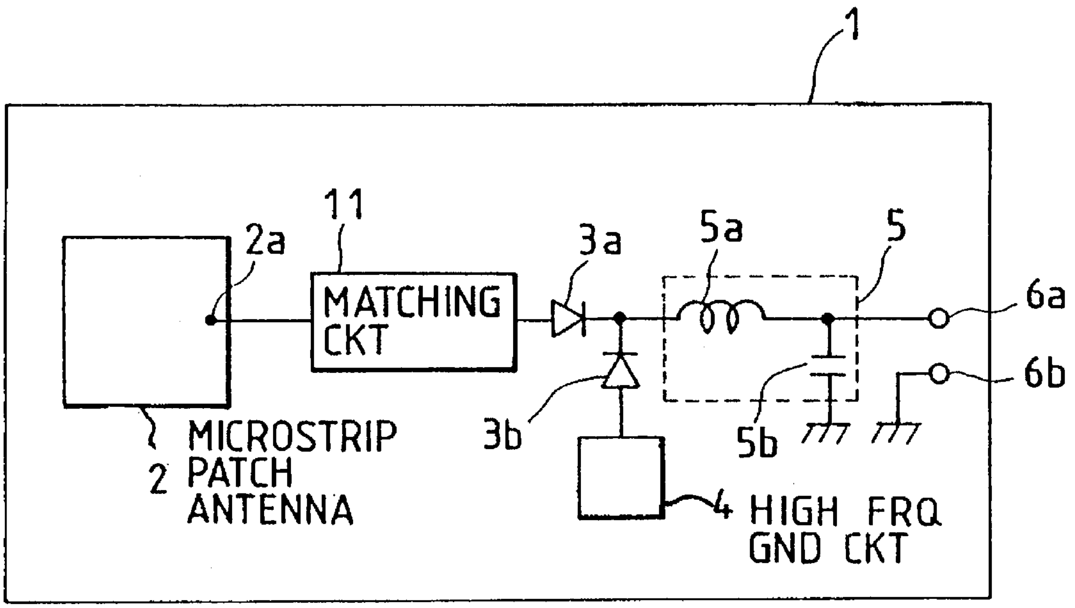
FIG. 5 is a plan view, partially schematic view, of the fifth embodiment of an electric power receiving and supplying circuit.
Figure 6:
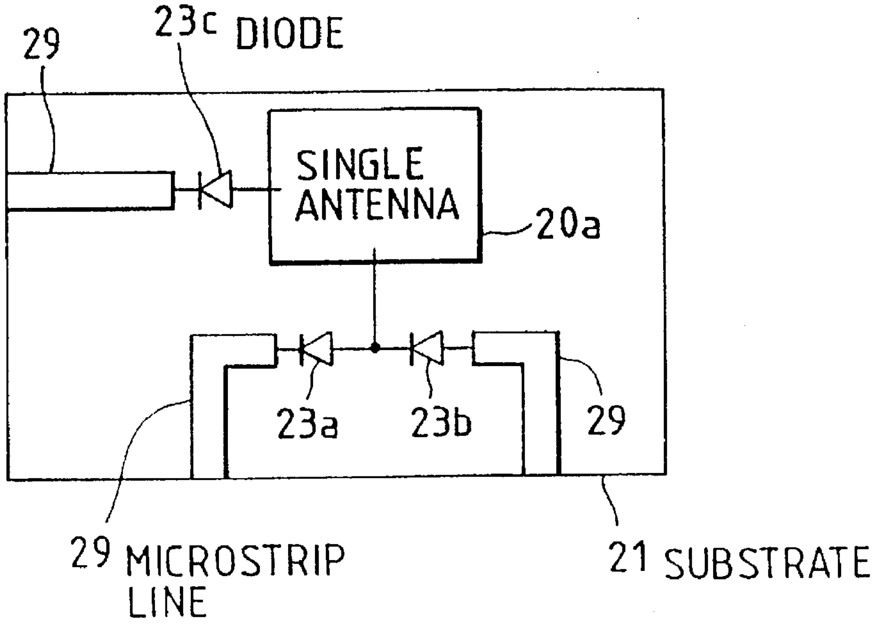
FIG. 6 PRIOR ART
FIG. 6 is a plan view, partially schematic view, of the prior art electric power receiving and supplying circuit.

A fifth embodiment will be described with reference to FIG. 5. FIG. 5 is a plan view, partially schematic view, of the fifth embodiment of an electric power receiving and supplying circuit.

The electric power receiving and supplying circuit of the fifth embodiment has substantially the same structure as the first embodiment. The difference is in that a matching circuit 11 is added between the feeding point 2*a* and the anode of the diode 3*a*.

The matching circuit 11 effects matching between the microstrip patch antenna 2 and the rectifying circuit 5 to increase the efficiency in the rectifying operation. In addition, the matching circuit 11 comprises a lowpass filter, so that the matching circuit 11 prevents to reradiate a high frequency component through the microstrip patch antenna 2. More specifically, the lowpass filter may comprise an inductance and a capacitor connected in parallel each other.

In this embodiment, the matching circuit 11 is provided between the feeding point 2*a*, so that the rectifying efficiently is further increased. The matching circuit 11 may be provided in the first to fourth embodiments also.

What is claimed is:

1. An electric power receiving and supplying circuit comprising:

an antenna, including a feeding point, for receiving a transmitted microwave signal and supplying an electric power from the received microwave signal;

a rectifying circuit, comprising: a first diode including an anode, connected to said feeding point, and a cathode, for effecting a first half-wave rectifying of said electric power; a second diode including a cathode, connected to said cathode of said first diode through a junction point, and an anode; and a high frequency grounding circuit including a resistor and a capacitor connected in parallel, for high-frequency-grounding said anode of said second diode, said second diode effecting a second half-wave rectifying of said electric power through said high frequency grounding circuit, said rectifying circuit supplying the first half-wave rectified electric power and the second half-wave rectified electric power as a full-wave rectified electric power from said junction point; and a lowpass filter for low-pass filtering said full-wave rectified electric power to supply a dc supply power.

2. An electric power receiving and supplying circuit as claimed in claim 1, wherein said antenna comprises: a microstrip patch antenna.

3. An electric power receiving and supplying circuit as claimed in claim 1, further comprising a matching circuit for matching the antenna and said rectifying circuit.

4. An electric power receiving and supplying circuit as claimed in claim 1, further comprising:

a third diode having an anode connected to said high frequency grounding circuit, and a cathode connected to said junction point.

5. An electric power receiving and supplying circuit as claimed in claim 4, further comprising a matching circuit for matching the antenna and said rectifying circuit.

6. An electric power receiving and supplying circuit as claimed in claim 1, further comprising:

a third diode having an anode connected to said high frequency grounding circuit, and a cathode connected to said anode of said second diode.

7. An electric power receiving and supplying circuit as claimed in claim 6, further comprising a matching circuit for matching the antenna and said rectifying circuit.

8. An electric power receiving and supplying circuit as claimed in claim 1, further comprising:

a third diode having a cathode connected to said feeding point and an anode connected to said high frequency grounding circuit and the anode of said second diode.

9. An electric power receiving and supplying circuit as claimed in claim 8, further comprising a matching circuit for matching the antenna and said rectifying circuit.

10. An electric power receiving and supplying circuit as claimed in claim 1, further comprising an identification signal generation circuit coupled to said lowpass filter and said antenna, wherein said identification signal generation circuit receives the dc supply power from the lowpass filter and supplies an identification signal to the antenna.

11. An electric power receiving and supplying circuit as claimed in claim 10, wherein said identification signal generation circuit is coupled to said antenna by a coupling diode, said coupling diode having an anode connected to an additional feeding point of said antenna and a cathode connected to an output of said identification signal generation circuit.

12. An electric power receiving and supplying circuit as claimed in claim 10, wherein said antenna transmits said identification signal in a different polarizing direction from the received microwave signal.

13. An electric power receiving and supplying circuit comprising:

an antenna, including a feeding point, for receiving a transmitted microwave signal and supplying an electric power from the received microwave signal;

a rectifying circuit, comprising: a first diode including an anode, connected to said feeding point, and a cathode; a second diode including a cathode, connected to said cathode of said first diode through a junction point, and an anode; and a high frequency grounding circuit for high-frequency-grounding said anode of said second diode, said rectifying circuit rectifying said electric power and supplying a rectified electric power from said junction point; and a lowpass filter for low-pass filtering said rectified electric power to supply a dc supply power;

wherein said high frequency grounding circuit comprised a resistor and a capacitor connected in parallel to each other.

14. An electric power receiving and supplying circuit comprising:

an antenna, including a feeding point, for receiving a transmitted microwave signal and supplying an electric power from the received microwave signal;

a rectifying circuit, comprising: a first diode including an anode, connected to said feeding point, and a cathode; a second diode including a cathode, connected to said cathode of said first diode through a junction point, and an anode; and a high frequency grounding circuit for high-frequency-grounding said anode of said second diode, said rectifying circuit rectifying said electric power and supplying a rectified electric power from said junction point;

a lowpass filter for low-pass filtering said rectified electric power to supply a dc supply power; and an identification signal generation circuit coupled to said lowpass filter and said antenna, wherein said identification signal generation circuit receives said dc supply power from said lowpass filter and supplies an identification signal to said antenna.

15. An electric power receiving and supplying circuit as claimed in claim 14, wherein said identification signal generation circuit is coupled to said antenna by a coupling diode, said coupling diode having an anode connected to an additional feeding point of said antenna and a cathode connected to an output of said identification signal generation circuit.

16. An electric power receiving and supplying circuit as claimed in claim 14, wherein said antenna transmits said identification signal in a different polarizing direction from the received microwave signal.

* * * * *

UNITED STATES PATENT AND TRADEMARK OFFICE

CERTIFICATE OF CORRECTION

PATENT NO. : 5,671,133
DATED : September 23, 1997
INVENTOR(S) : Suguru FUJITA et al.

It is certified that error appears in the above-indentified patent and that said Letters Patent is hereby corrected as shown below:

On the title page, Item [73],

Change the assignee's name from "Matsushita Electrical Industrial Co., Ltd." to --Matsushita Electric Industrial Co., Ltd.--

Signed and Sealed this

Twenty-fourth Day of February, 1998

Attest:

BRUCE LEHMAN

*Attesting Officer* *Commissioner of Patents and Trademarks*